US007193647B2

(12) United States Patent
Voss et al.

(10) Patent No.: US 7,193,647 B2
(45) Date of Patent: Mar. 20, 2007

(54) FILTERING STILL IMAGE DATA FROM A MULTIMODE STREAM

(75) Inventors: James S. Voss, Fort Collins, CO (US); James W. Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 720 days.

(21) Appl. No.: 10/304,947

(22) Filed: Nov. 27, 2002

(65) Prior Publication Data

US 2004/0100564 A1 May 27, 2004

(51) Int. Cl.
*H04N 5/225* (2006.01)

(52) U.S. Cl. .................................................. 348/220.1

(58) Field of Classification Search .................... None
See application file for complete search history.

(56) References Cited

U.S. PATENT DOCUMENTS

| 5,206,716 A * | 4/1993 | Taguchi et al. ........... 348/223.1 |
| 6,661,451 B1 * | 12/2003 | Kijima et al. ............. 348/220.1 |
| 6,871,010 B1 * | 3/2005 | Taguchi et al. ............. 386/120 |
| 2002/0001035 A1 * | 1/2002 | Haneda ...................... 348/220 |
| 2005/0146623 A1 * | 7/2005 | Juen ......................... 348/220.1 |

* cited by examiner

*Primary Examiner*—Ngoc-Yen Vu
*Assistant Examiner*—Anthony J. Daniels

(57) ABSTRACT

An imaging apparatus includes at least one photosensor array operable to generate a multimode stream of image data including still image data and video data. The imaging apparatus further comprises a controller operable to filter still image data from the multimode stream.

17 Claims, 6 Drawing Sheets

FILTERING STILL IMAGE DATA FROM A MULTIMODE STREAM

BACKGROUND

Digital imaging devices (e.g., cameras, camcorders, etc.) are highly available and very popular among consumers. Many of these digital imaging devices are capable of capturing both still images and video.

Digital cameras are increasingly popular and technology advances have resulted in these cameras having the capability to capture video data as well as high resolution still images. A digital camera captures an optical image (e.g., a subject, scene, or view) in elemental portions and generates an electronic signal that is representative of the subject, scene, or view. Unlike conventional film cameras that use a photo-responsive film as the image capturing medium, digital cameras typically use a photosensor array, such as one or more charge coupled devices (CCDs). The camera's optics focus an optical image of a photographic subject on an image plane of the photosensor array, which then generates digital data representative of the optical image. This digital data may then be stored and used to generate a display image of the photographic subject, for example, an image displayed on a liquid crystal display (LCD) or an image printed on paper by a printer.

Many of these digital cameras can operate in a first capture mode for capturing still image data, which includes one or more "still images" (i.e., digital data representing one or more optical images). The resolution of each of the still images (e.g., typically 2.1 mega pixels or greater) is usually higher than a standard "video frame" resolution. These digital cameras can also operate in a second capture mode for capturing relatively low resolution video data. In the second capture mode, the digital camera captures multiple time-sequenced-still images (known as "video frames") per second. A typical capture rate is 30 video frames per second. Such video frames are composed of "video data". The resolution of video data is usually lower (typically 0.3 mega pixels or less) than the resolution of the still image data. Operating in the first capture mode, the digital camera can capture the high resolution still images, but cannot process the high resolution still images as quickly as it can process the video frames captured using the second capture mode. For this reason, high resolution still image generally cannot be used to produce a "video" (a series of video frames used to simulate motion when "played back" in sequence. Therefore, if a user desires to capture both video and high resolution still images of a scene, the user would have to operate first in one capture mode and then in the other. However, in the time it takes to switch capture modes, the user may miss the desired still picture or desired video.

SUMMARY

According to an embodiment, a method comprises steps of generating a multimode stream of image data wherein the stream includes still image data and video data; determining whether a user event occurred; and filtering the still image data from the stream in response to the user event not occurring.

According to another embodiment, an imaging apparatus comprises an integrated circuit having a plurality of photo-receptive sensors. The integrated circuit is operable to generate a multimode stream of image data including still image data and video data. The imaging apparatus further comprises a buffer operable to store the stream, and a controller operable to filter still image data from the stream received from the buffer.

According to yet another embodiment, an apparatus comprises means for generating a multimode stream of image data wherein the stream includes still image data and video data; means for determining whether a user event occurred; and means for filtering the still image data from the stream in response to the user event not occurring.

DETAILED DESCRIPTION

Figure 1A:
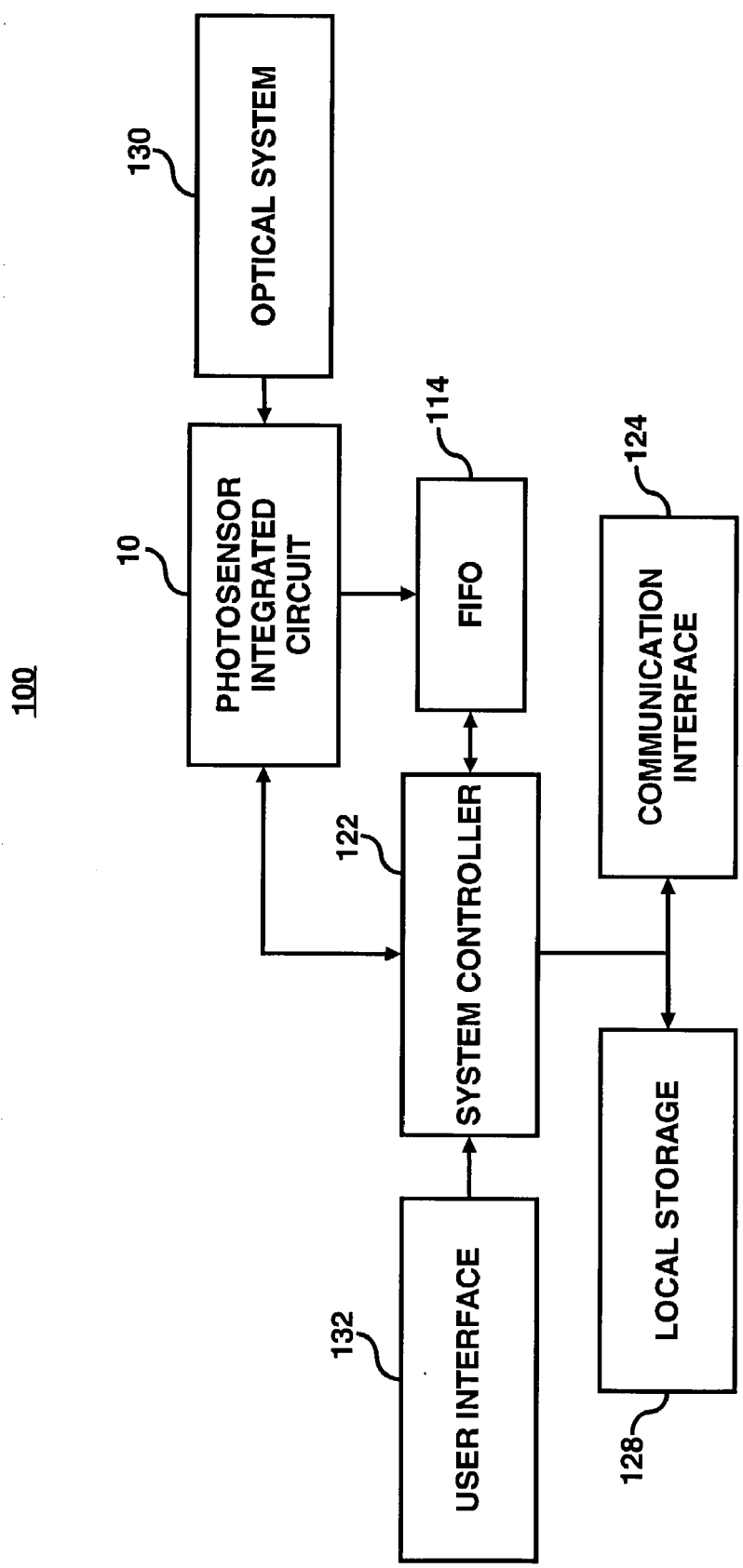
FIG. 1A illustrates an imaging system, according to an embodiment.

FIG. 1A is a block diagram of an imaging system 100, according to an embodiment. The imaging system 100 may be utilized in an imaging device, such as digital camera, camcorder or any image device capable of generating multimode image data. The imaging system 100 includes an optical system 130 that produces an optical image of a photographic subject on an array of photosensors provided on an integrated circuit 10. The sensors may include complementary metal oxide (CMOS) sensors, and the like. A system controller 122 may transmit timing signals to the integrated circuit 10 for controlling a rate of capture of images by the photosensors on the integrated circuit 10. The system controller 122 may include one or more processors, processing circuitry, such as ASICs, or a combination thereof.

The integrated circuit 10 generates digital image data (e.g., video data and/or still image data), which is output to a buffer 114. According to an embodiment, the system 100 is operable to substantially, simultaneously capture video data and still image data for generating a multimode stream of image data. Video data includes a stream of low resolution still images (e.g., video frames) and still image data may include one or more still images, typically having a higher resolution than the video data.

A CCD sensor is a charge storage and transfer device used by most digital cameras. The charge represents the light intensity falling on a sensor during a very short period of time known as the "operating interval" of the CCD, which ends at the instant of readout (i.e., when the charge is transferred). The charge can only be transferred from the CCD sensor one time per operating interval (i.e., a destructive readout). According to an embodiment, the integrated circuit 10 uses photosensors operable to perform nondestructive readouts, instead of CCDs, for substantially, simultaneously capturing video and still images, such as described in co-pending U.S. patent application Ser. No. 10/304,960, entitled, "Capturing Still Images and Video" by Voss et al., herein incorporated by reference in its entirety. Thus, a CMOS sensor or the like, which is able to readout image data multiple times per operating interval is used. With a CMOS sensor the present value of charge can be output from the CMOS sensor multiple times during an operating interval and the CMOS sensor will continue to accumulate charge until it is reset at the end of the operating interval. Therefore, a CMOS sensor array is capable of nondestructive readouts, which enables the system 100 to substantially simultaneously capture video and still images as described in detail below.

Figure 1B:
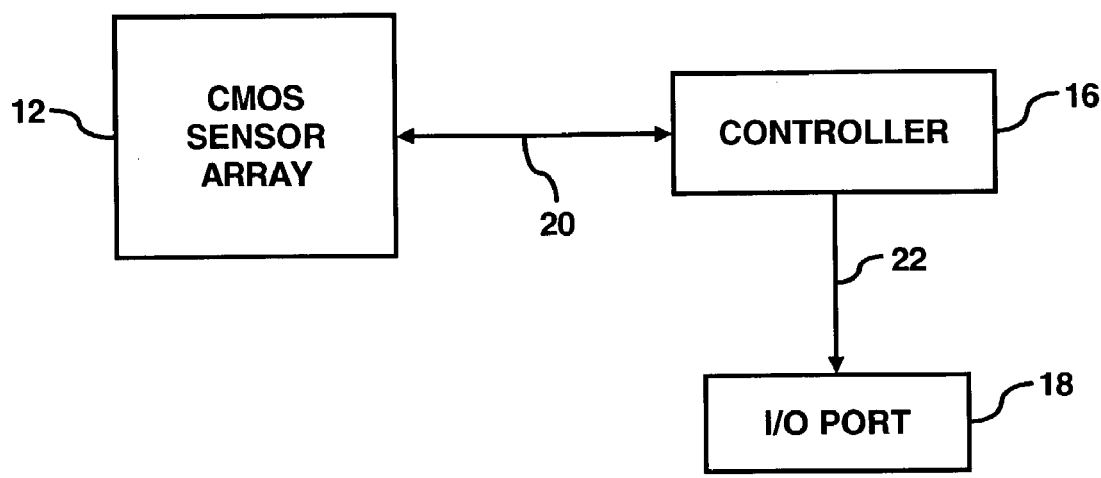
FIG. 1B illustrates an integrated circuit imaging device shown in the imaging system of FIG. 1A, according to an embodiment.

FIG. 1B illustrates an integrated circuit 10 using CMOS sensors, according to an embodiment, for generating the multimode stream. The integrated circuit 10 is formed from a CMOS process on a chip having at least one CMOS sensor array 12, a controller unit 16 and an input/output (I/O) port 18. The sensor array 12 may include a grid of individual CMOS light sensing picture elements (not shown) sensing an amount of light intensity illuminating the sensing elements, such as from the images produced thereon by the optical system 130 of FIG. 1. The sensor array 12 is configured to output analog signals representative of the amount of light intensity on the sensing elements to the controller 16 along an analog signal connection bus 20. Depending upon the configuration, analog signals from sensor elements in the array 12 may be output simultaneously in parallel, output one at a time in series, or output row-by-row or column-by-column, etc.

The controller unit 16 includes analog-to-digital (A/D) circuitry, not shown, for converting analog signals received from the sensor array 12 to digital signals. In addition, the controller unit 16 may contain circuitry for processing the received signals. The digital signals are routed along a digital bus line 22 to digital I/O port 18 for output. The controller unit 16, depending upon the configuration, can perform one of a wide variety of image processing operations including, for example, pattern recognition operations, filtering operations, Fourier transform operations, and the like. Resulting digital signals are output from circuit 10 through digital I/O port 18. Depending upon the implementation, the content and format of the digital signals output by the controller unit 16 may differ.

According to an embodiment, the integrated circuit 10 is capable of simultaneously capturing still image data and video data by performing pixel binning and using multiple exposure times. The integrated circuit 10 may include a known CMOS integrated circuit capable of performing binning. For example, FOVEON, provides a CMOS circuit with binning capability. As is known in the art, binning comprises summing pixels, which can improve image quality in poorly illuminated environments.

As described in copending U.S. patent application Ser. No. 10/304,960, the system 100 may use an exposure window and binning techniques for capturing still image data, such as high resolution still images, and video data substantially simultaneously. At a time within the exposure window, pixels are readout from the CMOS sensor array 12 in the integrated circuit 10. These pixels are binned for generating a video frame. Video data comprises one or more video frames, such as video frames readout during the exposure window. Substantially at the end of the exposure window pixels are readout again from the CMOS sensor array 12 (corresponding generally to the same optical image that produced the video data). These pixels, which usually have not been binned, are used to generate still image data (e.g., a high resolution still image). Therefore, the output of the integrated circuit 10, may include a multimode stream of video data and still image data, which is transmitted to the buffer 114.

The buffer 114 stores the multimode stream received from the integrated circuit 10. It will be apparent that a variety of known temporary storage devices may be used as a buffer 114. In one embodiment, the buffer 114 is a first-in-first-out (FIFO) buffer that stores the stream as it is generated. The system controller 122 is connected to the FIFO buffer 114 and a user interface 132 for the system 100. The system controller 122 is operable to retrieve image data from the FIFO buffer 114 and output the image data to a local storage 128 and/or a communication interface 124. The system controller 122 is also operable to detect user events on the user interface 132. Depending on whether a user event is detected, such as described in detail below, the system controller 122 may filter still image data from the image data in the FIFO buffer 114 for transmission to the local storage 128 and/or the communication interface 122.

Transmission of the image data to an external processing system may be accomplished using the communication interface 124. For instance, as a digital camera, the system 100 may include a communication interface that implements a computer peripheral bus standard such as universal serial bus (USB) or Institute of Electronic and Electrical Engineers (EEE) 1394 specification (1995). The local storage 128 may be of the non-volatile variety (e.g., a removable memory card, a rotating magnetic disk device, or other suitable memory device for permanent storage of digital image data).

Although not shown, the system 100 may include image processing circuitry including hardwired logic and/or a programmed processor that performs a variety of functions, including preparing digital image data based on sensor signals generated by the integrated circuit imaging device 10 for storage or transmission. Post processing may further include effects processing (e.g., fades, dissolves, overlays, etc.) and compression. These and other instances of well-known structures, interfaces, and processes have not been shown in detail in order not to unnecessarily obscure the embodiments.

Figure 2:
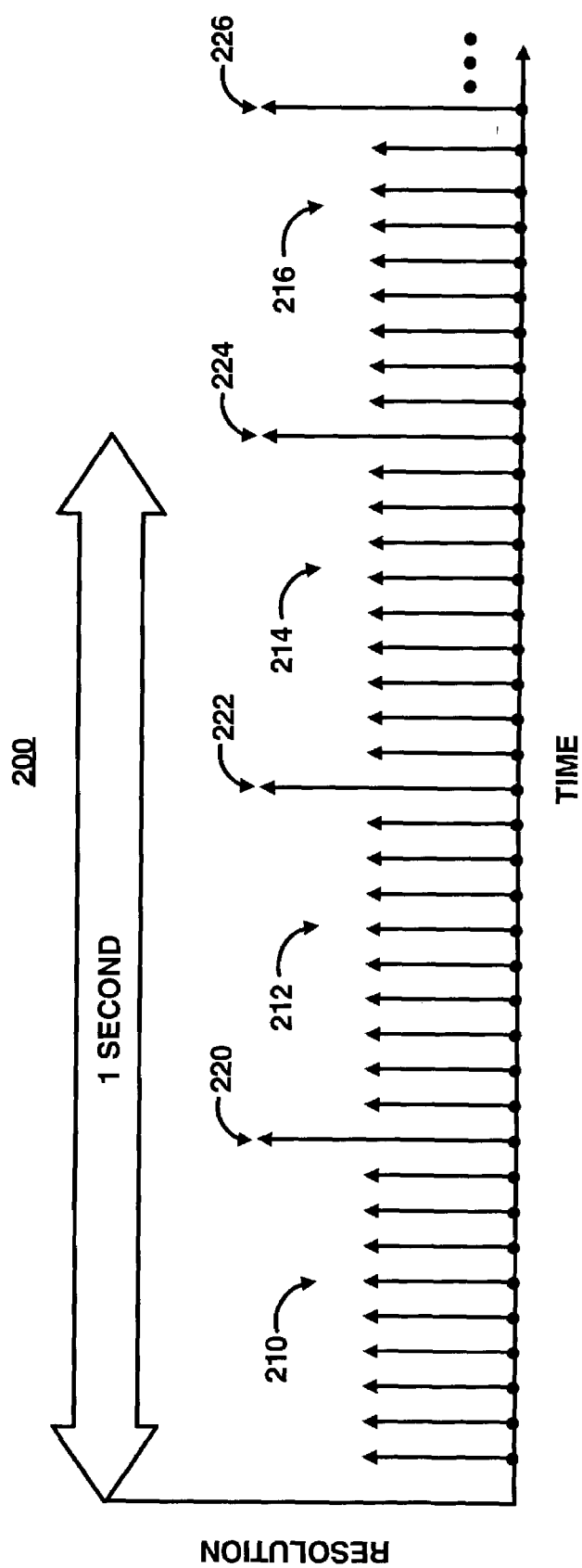
FIG. 2 illustrates a multimode stream of image data, according to an embodiment.

As described above, the integrated circuit 10 generates a multimode stream of image data including both video data and still image data. FIG. 2 illustrates a multimode stream 200 generated by the integrated circuit 10. Video data 210, 212, 214, 216, etc. and bursting high resolution still image data 220, 222, 224, 226., etc. are included in the stream 200. Different imaging devices may have different resolution capabilities for video and still images. Also, the resolution of an image may be a selectable feature on the imaging device.

The multimode stream 200 is output to the FIFO buffer 114. The FIFO buffer 114, for example, may store at least 3 seconds of image data or more in the multimode stream 200. The buffer size, however, can be larger or smaller depending on the requirements of the system. The system controller 122 receives the multimode stream stored in the FIFO buffer 114. The system controller 122 automatically filters the still image data (e.g., still image data 220, 222, 224, 226., etc.) and only outputs the video data (e.g., video data 210, 212, 214, 216, etc.) to the local storage 128. The still image data will not be filtered if a user event is detected, for example, by the system controller 122 connected to the user interface 132. When a user event is detected, both the still image data (220–226) and the video data (210–216) received from the FIFO buffer 114 are output to the local storage 128. The video data (210–216) and/or the still image data (220–226) may also be output to the communication interface 124.

A user event, for example, may include shutter activation or production of some other signal generated in response to pressing a button. Therefore, a user can control which still image he or she wants to store by, e.g., activating the shutter when a desired image is being captured by the system 100. When the user event is detected, still images in the time vicinity of the shutter activation are stored. For example, referring to FIG. 2, if shutter activation is detected at approximately the time the still image data 222 is generated, still images generated a predetermined period of time before and after (e.g., 1.5 seconds before and 1.5 after) are output to the local storage 128. For a 1.5 second predetermined period of time, still image data 220 and still image data captured before that in the 1.5 second window are output to the local storage 128. Also, still image data 224, 226, etc. (for example, up to 1.5 seconds or more after still image data 222 is generated) is output to the local storage 128 from the FIFO buffer 128. The 1.5 seconds of image data before and after the user event may coincide with the information in the FIFO buffer 114 storing 3 seconds of image data. By storing still image data before and after a user event is detected, the image system 100 prevents a user from missing a picture. Also, by not storing all the still image data (e.g., when a user event is not detected), limited storage space in the local storage 128 is efficiently utilized.

A user event is not limited to shutter activation, and another user event may be detected for determining whether to store still image data from the FIFO buffer 114. Also, the predetermined period of time before and after a user event is detected can be longer or shorter than 1.5 seconds, and the length of an exposure window is not limited to the length shown in FIG. 2.

Figure 3:
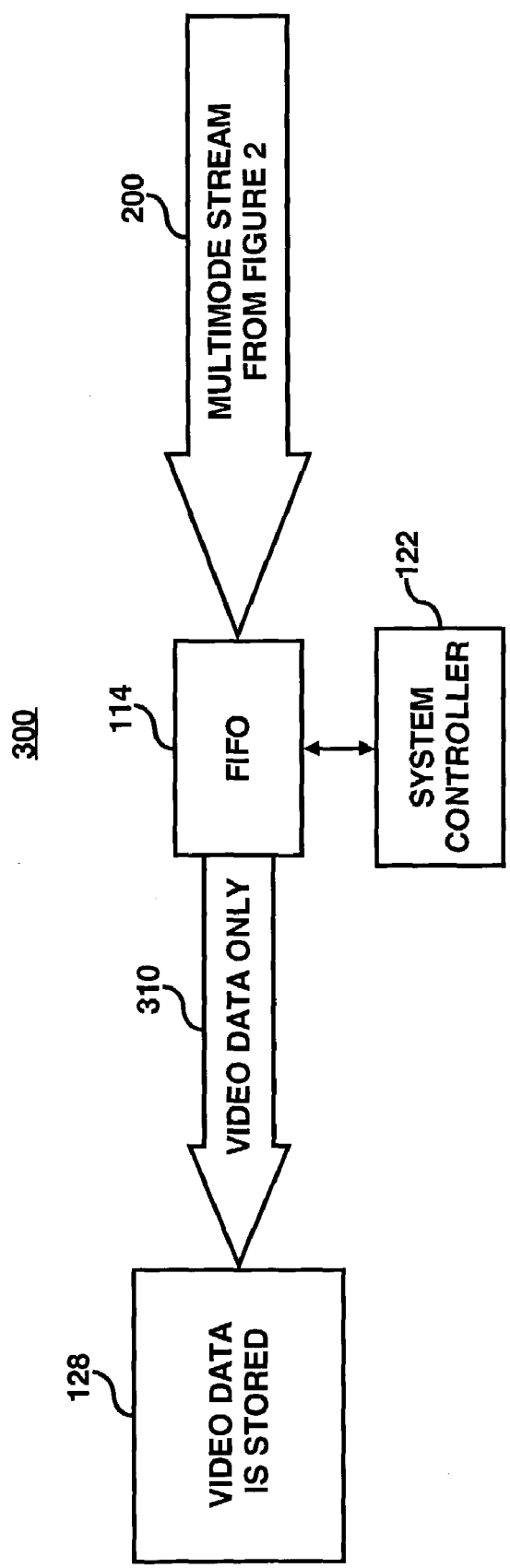
FIG. 3 illustrates a data flow diagram for storing video data from the multimode stream shown in FIG. 2, according to an embodiment.

FIG. 3 illustrates a data flow diagram 300 for storing video data from the multimode stream 200 when a user event is not detected. The stream 200 is received by the FIFO buffer 114. A user event is not detected. Therefore, the still image data from the stream 200 is filtered, and the video data 310 is output to the local storage 128. For example, the system controller 122 is operable to detect a user event and is operable to control input/output (I/O) operations for the FIFO buffer 114. Because a user event is not detected, the system controller 122 controls the FIFO buffer 114 such that video data is output from the FIFO buffer 114. Known data filtering techniques may be used. For example, the system controller 122 identifies the video data and controls the FIFO buffer 114 to output the video data. For the still image data, the system controller 122 identifies the still image data and it is not stored in the FIFO buffer 114. Alternatively, the still image data is stored in the FIFO buffer 114. Then, the system controller 122 identifies the still image data and overwrites the still image data with video data.

Figure 4:
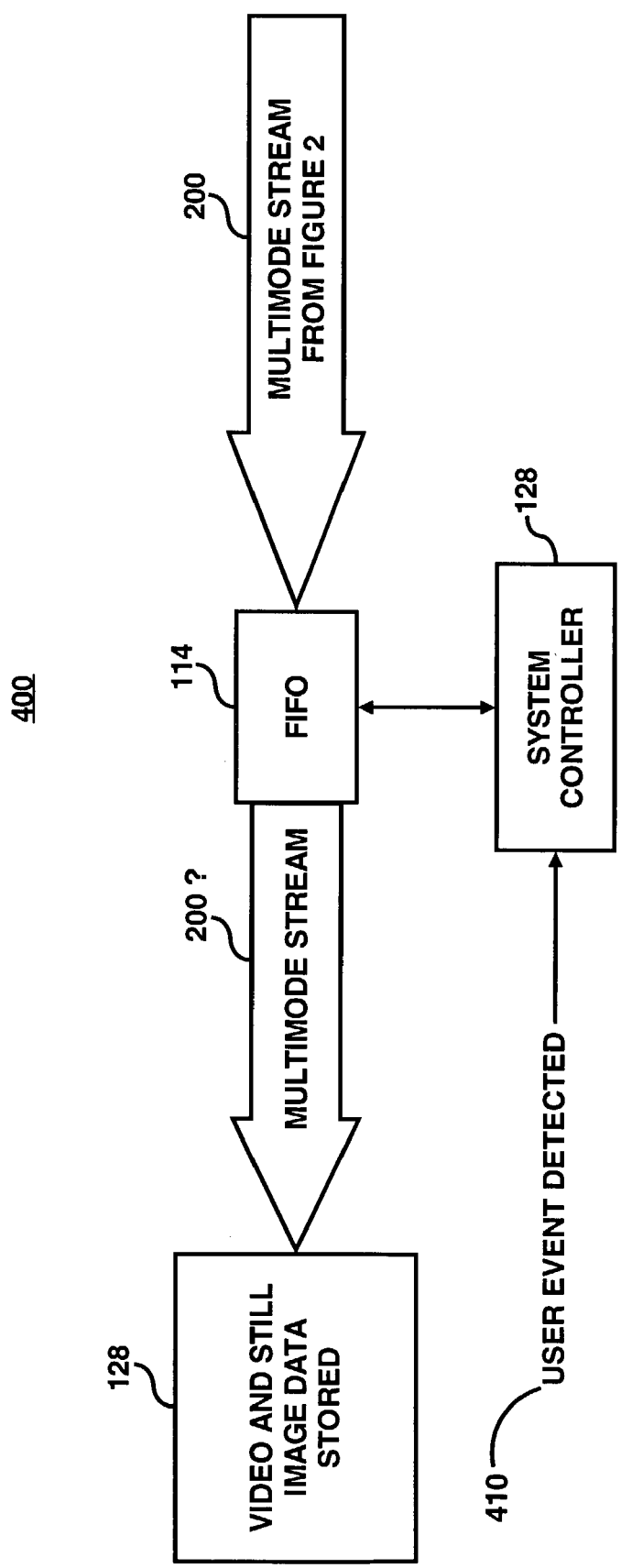
FIG. 4 illustrates a data flow diagram for storing still image data and video data from the multimode stream shown in FIG. 2, according to an embodiment.

FIG. 4 illustrates a data flow diagram 400 for storing still image data and video data from the multimode stream 200 when a user event is detected. The stream 200 is received by the FIFO buffer 114. A user event 410 is detected by the system controller 122. Therefore, the system controller 122 controls the output of the FIFO buffer 114 such that still image data within the predetermined period before and after the user event is output to the local storage 128. Also, the video data is output to the local storage 128.

Figure 5:
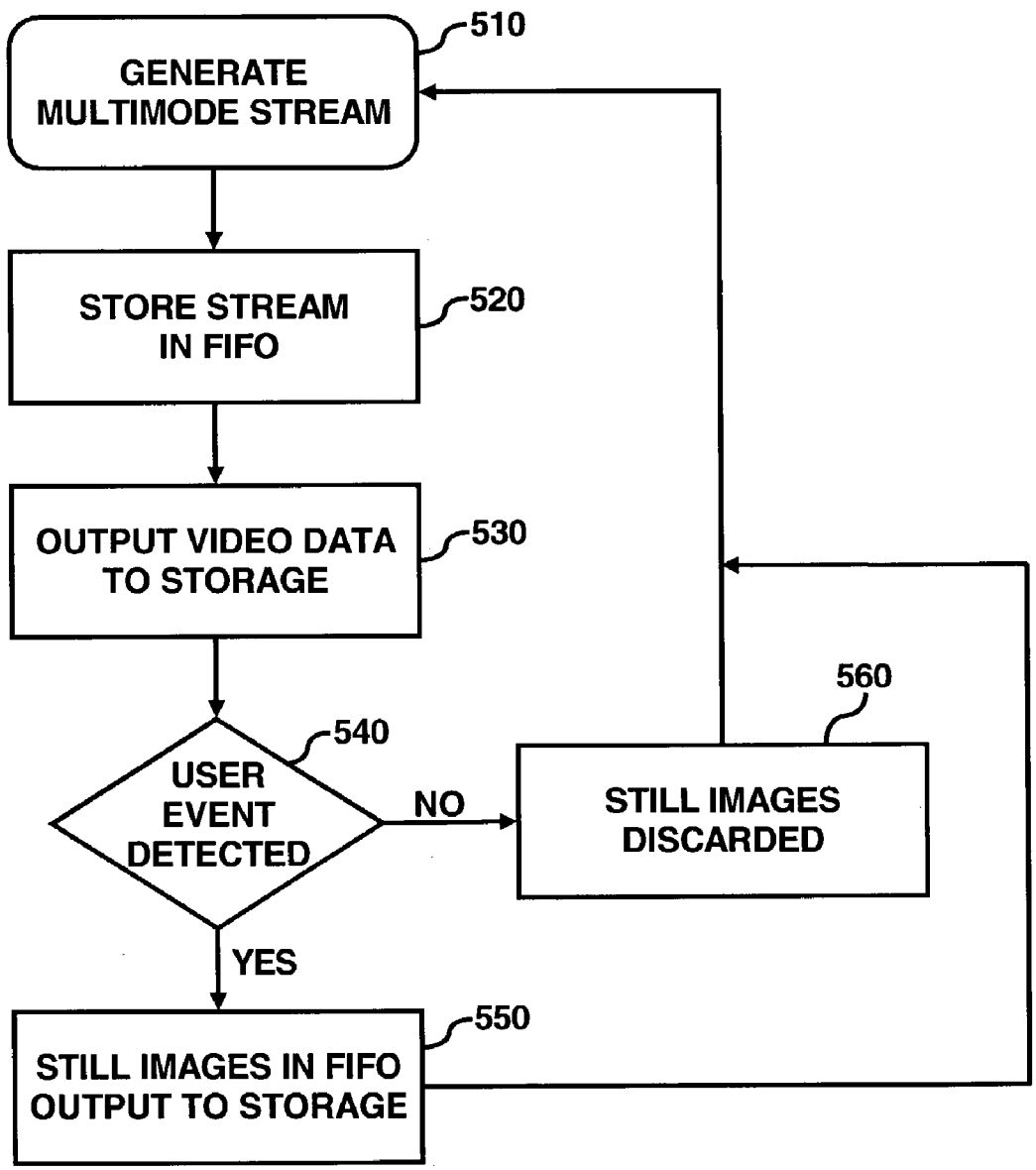
FIG. 5 illustrates a flow diagram of a method for capturing still image data and video data, according to an embodiment.

FIG. 5 illustrates a flow diagram of a method 500 for capturing still image data and video data, according to an embodiment. In step 510, a multimode stream is generated, for example, by the integrated circuit 10 and output to the FIFO buffer 114. In step 520, the multimode stream is stored in the FIFO buffer 114 (e.g., 3 seconds of image data) and monitored by the system controller 122. In step 530, the system controller 122 controls the I/O of the FIFO buffer 114 such that the FIFO buffer 114 outputs the video data from the multimode stream to the local storage 128. For example, the system controller 122 filters the still image data received from the FIFO buffer 114.

In step 540, the system controller 122 determines whether a user event occurred. If the user event occurred, the still image data from the multimode stream is output to the local storage 128 (step 550) from the FIFO buffer 114. For example, still image data for a predetermined period of time before the user event occurred and after the user event occurred is received from the FIFO buffer 114 and output by the system controller 122. If the user event did not occur, as determined in step 540, the still image data in the FIFO buffer 114 is filtered by the system controller 122 (step 560) so as to discard the still image data. The steps 520–560 may be repeated as long as the multimode stream is generated.

It will be apparent to one of ordinary skill in the art that the method 500 is subject to many alternatives, modifications and variations without departing from the spirit and scope of the embodiments. For example, a determination of whether the user event occurred (step 540) may be performed before step 530 or substantially simultaneously with step 530. These and other variations will be apparent to one of ordinary skill in the art.

What is claimed is:

1. A method for capturing images, including video images and still images in an imaging device, the method comprising steps of: generating a multimode stream of image data, the multimode stream is generated by each of at least one photosensor performing non-destructive readouts by outputting image data multiple times per photosensor operating interval to capture simultaneously both still image data and video data during the same operating interval, wherein the video data comprises one or more video frames and the still image data comprises a still image, and wherein a resolution of each still image of the still image data is higher than a resolution of each video frame of the video data; determining whether a user event occurred, wherein the user event is an indication of a desire to capture a still image and filtering the still image data from the multimode stream in response to the user event not occurring.

2. The method of claim 1, further comprising storing the multimode stream in a buffer.

3. The method of claim 2, wherein the step of filtering comprises filtering the still image data from the multimode stream stored in the buffer.

4. The method of claim 3, further comprising a step of transmitting the multimode stream from the buffer to one or more of a local storage device and a communication interface.

5. The method of claim 2, wherein the step of storing the multimode stream in a buffer further comprises storing a plurality of still images and video frames from the multimode stream in the buffer.

6. The method of claim 1, further comprising a step of transmitting the multimode stream to one or more of a local storage device and a communication interface in response to detecting the user event.

7. The method of claim 1, wherein the still image data comprises one or more still images, each still image including digital data representing an optical image.

8. The method of claim 1, wherein the user event is a shutter activation.

9. The method of claim 1, wherein the imaging device is a digital camera.

10. An imaging apparatus comprising: an integrated circuit having at least one photoreceptive sensor, the integrated circuit being operable to generate multimode stream of image data, wherein the multimode stream of image data is generated by each of the at least one photo-receptive sensor performing non-destructive readouts by outputting image data multiple times per photosensor operating interval to capture simultaneously both still image data and video data during the same operating interval, wherein the video data comprises one or more video frames and the still image data comprises a still imager and wherein a resolution of each still image of the still image data is higher than a resolution of each video frame of the video data; a buffer operable to store the multimode stream; and a controller operable to filter still image data from the multimode stream stored in the buffer until a user event is detected, wherein the user event is an indication of a desire to capture a still image.

11. The apparatus of claim 10, wherein the controller is operable to detect the user event and filter the still image data in response to not detecting the user event.

12. The apparatus of claim 11, further comprising a local storage device, wherein the controller is operable to transmit the multimode stream received from the buffer to the local storage device in response to detecting the user event.

13. The apparatus of claim 10, wherein the buffer stores at least 3 seconds of the multimode stream. user event.

14. An imaging apparatus comprising: means for generating a multimode stream of image data, wherein the multimode image is generated by each of at least one photosensor performing non-destructive readouts by outputting data multiple times per photosensor operating interval to capture simultaneously both still image data and video data within the same operating interval, wherein the video data comprises one or more video frames and the still image data comprises a still image, and wherein a resolution of each still image of the still image data is higher than a resolution each video frame of the video data; means for determining whether a user event occurred, wherein the user event is an indication of a desire to capture a still image; and means for filtering the still image data from the multimode stream in response to the user event not occurring.

15. The apparatus of claim 14, further comprising a buffer means for storing a predetermined amount of the multimode stream.

16. The apparatus of claim 15, wherein the means for filtering receives the predetermined amount of stream from the buffering means and filters the received stream.

17. The apparatus of claim 14, further comprising means for transmitting the multimode stream to one of a local storage device and a communication interface in response to detecting the user event.

* * * * *

UNITED STATES PATENT AND TRADEMARK OFFICE
CERTIFICATE OF CORRECTION

PATENT NO.        : 7,193,647 B2                               Page 1 of 1
APPLICATION NO.   : 10/304947
DATED             : March 20, 2007
INVENTOR(S)       : James S. Voss et al.

It is certified that error appears in the above-identified patent and that said Letters Patent is hereby corrected as shown below:

In column 4, line 27, delete "(EEE)" and insert -- (IEEE) --, therefor.

In column 6, line 29, in Claim 1, after "data," insert -- wherein --.

In column 7, line 3, in Claim 10, after "generate" insert -- a --.

In column 7, line 26, in Claim 13, after "stream." delete "user event.".

In column 8, line 2, in Claim 14, after "outputting" insert -- image --.

In column 8, line 9, in Claim 14, after "resolution" insert -- of --.

Signed and Sealed this

Fifth Day of May, 2009

JOHN DOLL
*Acting Director of the United States Patent and Trademark Office*